United States Patent
Weidke et al.

(10) Patent No.: US 12,472,830 B2
(45) Date of Patent: Nov. 18, 2025

(54) METHOD FOR CONTROLLING AN ELECTRIC DRIVE UNIT OF A VEHICLE, COMPUTER PROGRAM, COMPUTER READABLE MEDIUM, CONTROL UNIT, ELECTRIC DRIVE UNIT, AND VEHICLE

(71) Applicant: VOLVO CONSTRUCTION EQUIPMENT AB, Eskilstuna (SE)

(72) Inventors: Tim Weidke, Hilscheid (DE); Björn Dusemund, Trier (DE); Krishnent Sanal Kumar, Trier (DE)

(73) Assignee: VOLVO CONSTRUCTION EQUIPMENT AB, Eskilstuna (SE)

( * ) Notice: Subject to any disclaimer, the term of this patent is extended or adjusted under 35 U.S.C. 154(b) by 73 days.

(21) Appl. No.: 18/603,521

(22) Filed: Mar. 13, 2024

(65) Prior Publication Data

US 2024/0308352 A1    Sep. 19, 2024

(30) Foreign Application Priority Data

Mar. 14, 2023   (EP) ..................................... 23161738

(51) Int. Cl.
*B60L 15/20* (2006.01)

(52) U.S. Cl.
CPC ............ *B60L 15/20* (2013.01); *B60L 2200/40* (2013.01); *B60L 2240/421* (2013.01); *B60L 2240/423* (2013.01); *B60L 2240/429* (2013.01); *B60L 2250/28* (2013.01)

(58) Field of Classification Search
CPC ................ B60L 15/20; B60L 2200/40; B60L 2240/421; B60L 2240/423; B60L 2240/429; B60L 2240/12; B60L 2250/28; B60L 2250/26; B60L 3/10
See application file for complete search history.

(56) References Cited

U.S. PATENT DOCUMENTS

| | | | |
|---|---|---|---|
| 7,739,005 B1 * | 6/2010 | Tang .................. | B60L 3/10 701/69 |
| 10,391,884 B2 * | 8/2019 | Iwahana ............. | B60L 15/20 |
| 11,273,811 B2 * | 3/2022 | Books ................ | B60T 8/3255 |
| 2015/0006010 A1 * | 1/2015 | Ito ...................... | E02F 9/2235 903/930 |
| 2016/0075237 A1 | 3/2016 | Zhang et al. | |
| 2017/0274892 A1 * | 9/2017 | Miyashita .......... | B60K 1/00 |
| 2022/0041066 A1 * | 2/2022 | Isami ................. | B60K 23/02 |
| 2022/0194378 A1 * | 6/2022 | Sullivan ............. | B60L 7/24 |
| 2023/0311671 A1 * | 10/2023 | Yamada ............. | B60L 3/0061 701/22 |

OTHER PUBLICATIONS

Extended European Search Report, European Patent Application No. 23161738.2, mailed Nov. 20, 2023, 12 pages.

* cited by examiner

*Primary Examiner* — Farhana Pervin
(74) *Attorney, Agent, or Firm* — Sage Patent Group (57) ABSTRACT

A method for controlling an electric drive unit of a vehicle, in particular a construction machine such as a wheel loader, wherein the vehicle comprises a drive pedal for providing an actual drive pedal speed request value (SRV) for operating the electric drive unit depending on the degree of operation of the drive pedal, and the electric drive unit being signaling coupled to the drive pedal via a control unit, wherein the electric drive unit is configured for driving the vehicle depending on the actual drive pedal SRV.

18 Claims, 5 Drawing Sheets

METHOD FOR CONTROLLING AN ELECTRIC DRIVE UNIT OF A VEHICLE, COMPUTER PROGRAM, COMPUTER READABLE MEDIUM, CONTROL UNIT, ELECTRIC DRIVE UNIT, AND VEHICLE

CROSS REFERENCE TO RELATED APPLICATIONS

This application claims priority to European Patent Application No. 23161738.2, filed on Mar. 14, 2023, the disclosure and content of which is incorporated by reference herein in its entirety.

TECHNICAL FIELD

The disclosure relates to a method for controlling an electric drive unit of a vehicle. Further, the disclosure relates to a computer program, a computer readable medium, a control unit, an electric drive unit, and a vehicle. In particular, the vehicle is a construction machine such as a wheel loader.

The disclosure can be applied in heavy-duty vehicles, such as a wheel loader. Although the disclosure will be described with respect to a wheel loader, the disclosure is not restricted to this particular vehicle, but may also be used in other vehicles and construction machines.

BACKGROUND

CN113653124A discloses a shovel control method of a pure electric drive wheel type unmanned loader, which adopts vehicle speed closed-loop control and constant torque control. A target vehicle speed is set and the difference between the target vehicle speed and the current actual vehicle speed is obtained. With this information, in a closed loop control mode the vehicle speed is to set a target vehicle speed to make the vehicle run according to the target vehicle speed.

KR20190086987A discloses a driving control system of a working machine with a control unit for controlling the engine on the basis of a target vehicle speed and a current vehicle speed. When the error between the current vehicle speed and the target vehicle speed exceeds a predetermined range, the controller can control the engine accordingly.

WO2021193155A1 describes a work vehicle equipped with a work device such as a wheel loader with an electronic brake control system.

Known prior art has several disadvantageous. There is a need for improvements in the field of controlling an electric drive unit of a vehicle.

To achieve the best drivability of a wheel loader, it may be preferred in some embodiments to control the speed of the electric drive unit (speed control mode). In the speed control mode, the electric drive unit of vehicles, for examples of wheel loaders, is directly mapped to the drive pedal of the vehicle. This has the main disadvantage that the electric drive unit directly provides maximum torque from very low speeds on. This leads to unwanted wheel slips and leads to missing controllability, for example in case of a wheel loader, when a pile is approached to break out material, or if the ground is slippery.

SUMMARY

An object of the disclosure is to provide a method, a computer program, a computer readable medium, a control unit, an electric drive unit, and a vehicle to overcome the disadvantageous of the prior art. In particular, an object of the disclosure is to provide a method, a computer program, a computer readable medium, a control unit, an electric drive unit, and a vehicle to improve the control of the electric drive unit. In particular, an object of the disclosure is to provide a method, a computer program, a computer readable medium, a control unit, an electric drive unit, and a vehicle to have optimum control of both speed and torque provided by the electric drive unit.

According to a first aspect of the disclosure, the object is achieved by a method according to claim 1. The object is achieved by the method for controlling an electric drive unit of a vehicle, in particular a construction machine such as a wheel loader, wherein the vehicle comprises a drive pedal for providing an actual drive pedal speed request value for operating the electric drive unit depending on the degree of operation of the drive pedal, and the electric drive unit being signaling coupled to the drive pedal via a control unit, wherein the electric drive unit is configured for driving the vehicle depending on the actual drive pedal speed request value, the method comprising the steps of: determining an actual speed value of the electric drive unit; determining a maximum current limit function of the electric drive unit, wherein the maximum current limit function represents a maximum current limit value of the electric drive unit depending on the actual drive pedal speed request value; determining a reduced current limit function of the electric drive unit, wherein the reduced current limit function represents a reduced current limit value of the electric drive unit depending on the actual drive pedal speed request value; wherein mapping each drive pedal speed request value provided by the operated drive pedal to a respective maximum current limit value of the electric drive unit; and to a respective reduced current limit value of the reduced current limit function; and to a respective desired speed value; and determining the actual drive pedal speed request value; controlling the electric drive unit depending on the determined reduced current limit function of the electric drive unit if the desired speed value mapped to the determined actual drive pedal speed request value is similar or equal to the determined actual speed value of the electric drive unit; and depending on the determined maximum current limit function of the electric drive unit if the desired speed value mapped to the determined actual drive pedal speed request value is larger than the determined actual speed value of the electric drive unit.

The first aspect of the disclosure may seek to improve the control of the electric drive unit. In particular, the first aspect of the disclosure may seek to have optimum control of both speed and torque provided by the electric drive unit.

It is known that with a speed controlled electric drive unit, the pedal position of the drive pedal defines the requested speed of the driver for the electric drive unit. In this case, the current provided to the electric drive unit is provided up to the maximum current the electric drive unit can be operated with. Usually, the maximum possible current the electric drive unit is operated with is the represented by the physical current limit of the electric drive unit. However, the present disclosure is based on the findings of the inventors, that an only speed controlled electric drive unit has the disadvantage that the electric drive unit will always provide maximum torque in accordance to a maximum current limit function of the electric drive unit in order to reach the speed requested via the drive pedal if necessary. This is disadvantageous when using some vehicles. For example, for road machinery it is a frequent operation to dig material of a pile or alike. The inventors find that the maximum torque behavior when using a speed controlled electric drive unit complicates the machine control in this situation. This is due, for example, to slipping wheels of the vehicle. Therefore, the inventors find that an additional current-limit dependent on a drive pedal speed request can be implemented to enable a torque control in these specific working situations. Accordingly, the inventors propose to introduce a reduced current limit function as limit of a current provided to the electric drive unit.

With this approach, the overall speed controlled behavior of the electric drive unit remains unaffected in standard driving conditions. However, it enables a torque control in blocked or high loaded driveline conditions when the requested speed cannot be reached as the resistance that would need to be overcome is larger than the torque generated via the electric drive unit. For example, the blocked or high loaded driveline condition may be approaching and digging into a pile of sand or alike.

It is the inventors finding that the present disclosure enables a more sensitive control of the electric drive unit, in particular when operated at a lower speed. In particular, unwanted spinning or slipping of the wheels in blocked or high load conditions is avoided.

In particular, the object is achieved by a method for controlling an electric drive unit of a vehicle. In some embodiments, the vehicle is a construction machine, for example a wheel loader. In particular, the vehicle is an electric vehicle.

Such a vehicle, for example a wheel loader, comprises a drive pedal and the electric drive unit. In some embodiments, the electric drive unit is a direct current electric drive unit or an alternating current electric drive unit. In particular, the alternating current electric drive unit is an asynchronous current electric drive unit. The asynchronous current electric drive unit is also known as induction drive unit.

In principle, the present disclosure is applicable to both direct current electric drive units and alternating current electric drive units. Insofar as the disclosed subject matter is described here in relation to direct current (DC), this applies accordingly to alternating current (AC) and vice versa. In particular, if this is not expressly excluded.

In some embodiments, the vehicle comprises one or more electric drive units for operating the electric vehicle. In some embodiments, it may be preferred to provide an electric drive unit for each wheel of the vehicle or for each axis of the vehicle for operating the electric vehicle.

In particular, the one or more electric drive units are traction motors and/or motors for work function. In some embodiments, it may be preferred that the vehicle comprises electric drive units provided as traction motors and separate electric drive units provided for enabling work functions such as operating an excavator bucket or alike.

In some embodiments, the vehicle, in particular the electric vehicle, comprises an electric energy storage unit. The electric energy storage unit may comprise a battery or an accumulator respectively several batteries or several accumulators. In some embodiments, it may be preferred that the electric energy storage unit comprise of or comprises lithium-ion cells. It is to be understood that the electric energy storage unit provides a direct current. The direct current provided by the electric energy storage unit may be converted to an alternating current by means of a converter. Such a converter may supply or provide an alternating current.

In some embodiments, the vehicle comprises an electro-hydraulic pump. This electro-hydraulic pump may be coupled to the electric energy storage unit for operating the electro-hydraulic pump. For example, the electro-hydraulic pump may be used for operating the excavator bucket of a wheel loader.

Further in some embodiments, the vehicle comprises a generator. This generator may be coupled to the electric energy storage unit for charging the electric energy storage unit. In particular, the generator may convert mechanical energy into electric energy in order to charge the electric energy storage unit. It may also be preferable in some embodiments for the one or more electric drive units to be operated as a generator.

Usually, the electric drive unit is powered by the electric energy storage unit, for example a group of rechargeable batteries. These batteries can be recharged by connecting the vehicle to a charging station. The charging station may either provide direct current or alternating current.

Electric drive unit utilizes the principle of electromagnetism to convert electrical energy into mechanical energy. For example, when the driver of the vehicle presses the drive pedal, the electric drive unit draws energy from the electric energy storage unit and uses it to turn the wheels of the vehicle. Unlike a petrol engine, which uses combustion to generate motion, an electric drive unit delivers instant torque, allowing for very smooth acceleration.

An electric drive unit comprises a rotor and a stator. The stator is the stationary part of the drive unit, while the rotor is the rotating part. The stator may comprise a series of coils that are energized to create a magnetic field. When the current flows through the coils, it creates a magnetic field that interacts with the rotor and causes it to rotate.

The rotor comprises a series of magnets arranged in a specific pattern. When the stator's magnetic field interacts with the rotor's magnets, a rotational force is created that causes the rotor to rotate. This rotational force is transferred to the wheels of the vehicle and drives the vehicle. In some embodiments, it may be preferred to transfer the rotational force to the wheels of the vehicle via a gear box or alike.

There are two types of electric drive units that are most commonly used: alternating current (AC) drive units and direct current (DC) drive units. AC drive units are most commonly used in electric vehicle as they are more efficient and easier to control. However, DC drive units are still used in some electric vehicles. This is because, unlike AC drive units, DC drive units generally do not require inverters in order to be operated by the electric energy storage unit of an electric vehicle. In the simplest case, direct current motors can be connected directly to direct current from the batteries. On the other side, AC drive units usually require additional electronic devices, such as inverters, in order to be operated by the electric energy storage unit of an electric vehicle. These inverters are required to convert the direct current from the electric energy storage unit into alternating current, which is needed to operate the drive unit. These inverters are part of an electric vehicle's drivetrain and play an important role in controlling the drive unit, power output and efficiency of the vehicle.

In an AC drive unit, the coils of the stator may be arranged in a specific pattern to create a rotating magnetic field. This rotating magnetic field interacts with the magnets of the rotor and causes it to rotate. For example, the speed and torque of the electric drive unit can be controlled by adjusting the frequency and amplitude of the current supplied to the electric drive unit.

In a DC drive unit, the stator coils are connected to a series of commutators that change the direction of the current flowing through the coils as the rotor turns. This creates a magnetic field that interacts with the magnets of the rotor and causes it to rotate. The speed and torque of the motor can be controlled by changing the voltage of the current supplied to the motor.

Of course, both AC and DC motors are powered by the vehicle's battery, which stores electricity generated when the vehicle is connected to an external power source (e.g. a charging station) or, to a lesser extent, by regenerative braking. The battery is connected to an inverter that converts the electricity stored in the battery into electricity that can be used to power the engine.

The drive pedal is configured for providing an actual drive pedal speed request value for the electric drive unit depending on the degree of operation of the drive pedal. The actual drive pedal speed request value may be detected by a respective sensor that detects the movement and/or degree of displacement of the pedal. For example, the sensor may be an angle sensor to detect the angle and, thus, the amount a pedal is pushed. It is to be understood that any sensor that is suitable for detecting the movement and/or degree of displacement of the pedal may be applied. The degree of operation of the drive pedal may be represented by 0% or 0 if the gas pedal is not pushed down at all and by 100% or 1 if the gas pedal is pushed down all the way. In some embodiments, the degree of operation changes between 0% or 0 and 100% or 1 in a linear manner. It is to be understood that the degree of operation of the drive pedal may be represented by means of a voltage or current signal of the respective sensor. For example, the degree of operation at 0% or 0 is represented by 0 V or 0 mA and the degree of operation at 100% or 1 is represented by 10 V or 20 mA in accordance to DIN IEC 60381-1 or DIN IEC 60381-2. Of course any other common standard signals may as well represent the degree of operation of the drive pedal.

The electric drive unit is configured for driving the vehicle depending on the actual drive pedal speed request value. For this purpose, the electric drive unit may be signaling coupled to the drive pedal for controlling the speed of the electric drive unit of a vehicle. Additionally or alternatively, the electric drive unit may be signaling coupled to the respective sensor for controlling the speed of the electric drive unit of a vehicle. In particular, the electric energy storage system may be signaling coupled to the to the drive pedal for controlling the speed of the electric drive unit of a vehicle. Additionally or alternatively, the electric energy storage system may be signaling coupled to the respective sensor for providing the current needed for controlling the speed of the electric drive unit of the vehicle.

In particular, it may be preferred in some embodiments, that the vehicle and/or the electric drive unit comprise a control unit. In some embodiments, the pedal and/or the electric drive unit and/or the sensor and/or the electric energy storage system are signaling coupled to the control unit for controlling the electric drive unit and/or the electric energy storage system of the vehicle.

In one embodiment, the vehicle comprises one electric drive unit that is connected to the wheels of a vehicle for driving the vehicle. However, it may also be preferred in some embodiments that the vehicle comprises two or more electric drive units, wherein each of the electric drive units is coupled to one or more different wheels and/or separate wheels of the vehicle. In particular, in some embodiments it may be preferred that the vehicle comprises an electric drive unit for each wheel of the vehicle, i.e. for example, that a vehicle comprising four wheels comprises four electric drive units, wherein each electric drive unit is coupled to one of the four wheels of the vehicle for driving the vehicle.

For operation of the electric drive unit, the electric drive unit may be coupled to the electric energy storage unit. In some embodiments, it may be preferred to arrange a converter between the energy storage unit and the electric drive unit. In particular, the converter may be provided to transfer a direct current provided from the electric energy storage unit to alternating current provided to the electric drive unit. This is needed if the electric drive unit is operated with alternating current.

For controlling the electric drive unit of the vehicle the method comprises several steps as will be detailed out below. In particular, for controlling the electric drive unit depending on the speed control and the torque control of the electric drive unit, the method comprises several steps.

One step of the method is to determine an actual speed value of the electric drive unit. The actual speed value of the electric drive unit may be determined by means of a speed sensor that measures the speed of the electric drive unit. Additionally or alternatively, the actual speed value of the electric drive unit may be determined by means of a speed sensor that measures the speed of the wheels of the vehicle the electric drive unit is coupled to. This requires that the transmission of the speed of the respective wheel and electric drive unit is known. Further, additionally or alternatively, the actual speed value of the electric drive unit may be determined by means of a speed sensor that measures the speed of the vehicle itself, for example based on a Global Navigation Satellite System.

For example, known speed sensors may be based on electromagnetic induction, capacity, optics or alike. For example, a hall sensor may be used as speed sensor or the speed sensor may be based on the Doppler-effect.

As a further step, the method comprises the step of determining a maximum current limit function of the electric drive unit. In some embodiments, the maximum current limit function of the electric drive unit is the current the electric drive unit is operated with. In particular, the maximum current limit function of the electric drive unit is the current the electric drive unit is operated with vie the electric energy storage system. The maximum current limit function may represent a maximum current limit value of the electric drive unit depending on the actual drive pedal speed request value. In some embodiments, the maximum current limit function may represent a maximum current limit value of the electric drive unit corresponding to the actual drive pedal speed request value. The maximum current limit function may be limited by the physical current limit of the electric drive unit. Thus, as the physical current limit may depend on the type of the electric drive unit, the maximum current limit function varies accordingly. In particular, the maximum current limit function is defined by the physical and/or characteristic maximum output current of the electric drive unit. In particular, the maximum current limit function is defined by the type of electric drive unit to be controlled alone or the electric drive unit to be controlled and electrical components such, for example the converter. Further in some embodiments, the maximum current limit function represents the current under full load of the electric drive unit. Full load is an operating state of the electric drive unit in which it is operated with the maximum possible current or it provides the maximum possible torque at a given speed.

The maximum current limit function depends on a drive pedal speed request value or speed. In some embodiments, the maximum current limit function depends linearly on the drive pedal speed request value up to a first threshold pedal speed request value of the drive pedal speed request and is a constant value independent of the drive pedal speed request value once reaching or exceeding the first threshold pedal speed request value of the drive pedal speed request. In some embodiments, the maximum current limit function depends linearly on the speed of the electric drive unit up to a first threshold speed value and is a constant value independent of the speed value once reaching or exceeding the first threshold speed value.

In this respect, the maximum current limit function comprises a linear function section and a constant function section. The change from the linear function section to the constant function section takes place at the first threshold pedal speed request value or at the first threshold speed value.

It is to be understood that the linear section of the maximum current limit function is defined by a starting point and an end point.

The starting point of the maximum current limit function represents a maximum current enabling the maximum traction force of the vehicle or electric drive unit out of stand still. Thus, usually, depending on the type of vehicle, field of application and alike, the electric drive unit and, thus, the starting point will be provided. The current at the end point of the maximum current limit function is a current above 0 A of the vehicle or electric drive unit at the first threshold drive pedal speed request value of the drive pedal speed request or the first threshold speed value. In some embodiments, the current at the end point of the maximum current limit function represents the maximum current at the first threshold drive pedal speed request value of the drive pedal speed request or the first threshold speed value. In some embodiments, the starting point of the maximum current limit function is a current above a driving resistance of the vehicle or electric drive unit for starting on level ground in an unblocked driving condition. For example, in an unblocked driving condition the vehicle is rolling on a plane without the bucket of the wheel loader digging in a pile of sand or alike.

In some embodiments, the maximum current limit function is determined prior the use of the electric drive unit. For example, the user of the electric drive unit may determine the maximum current limit function. Additionally or alternatively, the maximum current limit function may be determined by the manufacturer and/or mechanics of a workshop. In particular, the maximum current limit function is defined by the electric drive unit, i.e. the characteristics of the electric drive unit.

In some embodiments, the maximum current limit function may lie below the physically possible current characteristic. In particular, in some embodiments it may be preferred that the maximum current limit function is below the physically possible current characteristic by a constant factor. For example, the constant factor can be 10%, so that the maximum current limit function corresponds to 90% of the physically possible current characteristic. Of course, other factors are also possible. These can be specified by the user or by the manufacturer.

In particular, the maximum current limit of the electric drive unit is the highest level of current the electric drive unit may handle without causing damage to the windings or any other components of the electric drive unit. Usually, the maximum current limit is determined by the design specifications of the electric drive unit and depends on factors such as the wire gauge, the type of insulation, and the cooling system of the electric drive unit. For example, exceeding the maximum current limit of the electric drive unit may cause excessive heating and potentially cause the electric drive unit to fail.

In another step, the method comprises the step of determining a reduced current limit function of the electric drive unit. In some embodiments, the reduced current limit function of the electric drive unit is the current the electric drive unit is operated with. In particular, the reduced current limit function of the electric drive unit is the current the electric drive unit is operated with vie the electric energy storage system. The reduced current limit function may represent a reduced current limit value of the electric drive unit depending on the actual drive pedal speed request value. In some embodiments, the reduced current limit function may represent a reduced current limit value of the electric drive unit corresponding to the actual drive pedal speed request value. For example, the manufacturer of the vehicle or the user of the vehicle may determine the reduced current limit function of the electric drive unit. In some embodiments, they may determine the reduced current limit function by setting or selecting the reduced current limit function in a control unit or alike. In some embodiments, the control unit comprises a set of reduced current limit function, which may be set or selected from when determining the reduced current limit function of the electric drive unit.

In some embodiments, the minimum current limit function represents the current under partial load of the electric drive unit. Partial load is an operating state of the electric drive unit in which it is operated with a reduced, i.e. throttled or choked, (maximum) current or it provides a reduced possible (maximum) torque at a given speed.

The reduced current limit function depends on a drive pedal speed request value. In some embodiments, the reduced current limit function depends linearly on the drive pedal speed request value up to a second threshold drive pedal speed request value of the drive pedal speed request and is a constant value independent of the drive pedal speed request value once reaching or exceeding the second threshold drive pedal speed request value of the drive pedal speed request. Additionally or alternatively, the reduced current limit function depends linearly on the speed of the electric drive unit up to a second threshold speed value and is a constant value independent of the speed of the electric drive unit once reaching or exceeding the second threshold speed value.

In this respect, the reduced current limit function comprises a linear function section and a constant function section. The change from the linear function section to the constant function section takes place at the second threshold pedal speed request value or at the second threshold speed value.

It is to be understood that the linear section of the reduced current limit function is defined by a starting point and an end point.

The current at the starting point of the reduced current limit function is a current above 0 A of the vehicle or electric drive unit at stand still and below the current of the starting point of the reduced current limit function of the vehicle or electric drive unit at stand still. Thus, usually, depending on the type of vehicle, field of application and alike, the electric drive unit and, thus, the starting point will be provided. In some embodiments, the starting point of the reduced current limit function is a current above a driving resistance of the vehicle or electric drive unit for starting on level ground in an unblocked driving condition. For example, in an unblocked driving condition the vehicle is rolling on a plane without the bucket of the wheel loader digging in a pile of sand or alike. However, the current value of the starting point of the reduced current limit function is smaller than the current value of the starting point of the maximum current limit function.

The current at the end point of the reduced current limit function is a current above 0 A of the vehicle or electric drive unit at the second threshold drive pedal speed request value of the drive pedal speed request or the second threshold speed value. In some embodiments, the current at the end point of the reduced current limit function is equal to the current of the maximum current limit function in its constant section. In particular, the choice of the end point of the reduced current limit function allows to define the resolution of the adjustable current or tractional torque in blocked or high loaded condition of the electric drive unit.

In some embodiments, the second threshold drive pedal speed request value of the drive pedal speed request is larger than the first threshold drive pedal speed request value of the drive pedal speed request or the second threshold speed value is larger than the first threshold speed value.

It is to be understood that the resolution of the current or torque control is increased if the value of the second threshold value is increased or if the slope of the linear function section reduced current limit function is decreased. However, this also effects the speed control since the current limit can cause that the requested speed cannot be reached anymore at a certain speed pedal request value. In this case the speed pedal request value, i.e. the degree of operation needs to be increased.

In some embodiments, it may be preferred that the slope of the slope of the linear function section reduced current limit function is equal to the slope of the linear function section maximum current limit function. Further, in some embodiments it may be preferred that the slope of the linear function section of the reduced current limit function is larger or smaller than the slope of the linear function section of the maximum current limit function.

In some embodiments, the reduced current limit function is determined prior the use of the electric drive unit. For example, the user of the electric drive unit may determine the reduced current limit function. Additionally or alternatively, the reduced current limit function may be determined by the manufacturer and/or mechanics of a workshop. In particular, the reduced current limit function is defined by the electric drive unit, i.e. the characteristics of the electric drive unit.

In some embodiments, the value of the reduced current limit function of a certain drive pedal speed request value is smaller than the value of the maximum current limit function of this certain drive pedal speed request value or speed value. In particular, the value of the reduced current limit function of a certain drive pedal speed request value is smaller than the value of the maximum current limit function of this certain drive pedal speed request value or speed value if the speed is smaller than the second threshold speed value or if the speed request value is smaller than the second threshold drive pedal speed request value.

In some embodiments, the reduced current limit function defines the lowest available torque in blocked or low speed applications. Approaching and filling a bucket or grading are examples for a blocked or low speed application. Thus, operating the vehicle with the reduced current limit function enables a good controllability of the actual torque of the drivetrain besides the primary speed control in normal driving applications.

It is to be understood that the method for controlling depending on speed control or torque control is in particular applicable with respect to the area specified by the starting points and end points of the maximum current limit function and the reduced current limit function. In particular, the method for controlling depending on speed control or torque control is in particular applicable with respect to a speed equal to or below the second threshold speed value or with respect to a speed request value equal to or below the second threshold drive pedal speed request value. In particular, the electric drive unit is controlled depending on speed control if the speed is larger than the second threshold speed value or with respect to a speed request value is larger than the second threshold drive pedal speed request value.

In some embodiments, the threshold values, in particular the first and/or second threshold values, are determined or defined by means of the manufacturer. In particular, the threshold values, in particular the first and/or second threshold values, may be determined or defined depending on the desired resolution or responsiveness of the electric drive unit. For example, if a responsiveness is to be reduced, the threshold values, in particular the first and/or second threshold values, are to be increased and vice versa. By increasing the threshold values, in particular the first and/or second threshold values, the slopes of the respective limit functions are reduced. Accordingly, if the threshold values, in particular the first and/or second threshold values, are lowered, the slopes of the respective limit functions are increased and the responsiveness of the electric drive unit is increased accordingly.

For example, it is conceivable that the user could be given the option of setting the threshold values via corresponding controllers. These controllers may be mechanical controllers or virtual controllers provided via a graphic user interface.

Further, the method comprises the step of mapping each drive pedal speed request value provided by the operated drive pedal to a respective maximum current limit value of the electric drive unit, to a respective reduced current limit value of the reduced current limit function, and to a respective desired speed value. This is a crucial step to enable control of the vehicle, respectively the electric drive unit at optimum speed and torque to prevent slipping wheels and alike.

The step of mapping each drive pedal speed request value provided by the operated drive pedal to a respective maximum current limit value of the electric drive unit results from the maximum current limit function. As the maximum current limit function may be a function of a drive pedal speed request, the drive pedal speed request value is mapped to the respective maximum current limit value by "inserting" the drive pedal speed request value in the maximum current limit function. The step of mapping each drive pedal speed request value provided by the operated drive pedal to a respective maximum current limit value of the electric drive unit results from the maximum current limit function. As the maximum current limit function may be a function of a drive pedal speed request, the drive pedal speed request value is mapped to the respective maximum current limit value by "inserting" the drive pedal speed request value in the maximum current limit function. However, it is also conceivable that this mapping is done using a table or similar, wherein a drive pedal speed request value is assigned to a maximum current limit value such as the mapping is rather a selecting the maximum current limit value assigned to the respective drive pedal speed request value.

The step of mapping each drive pedal speed request value provided by the operated drive pedal to a respective reduced current limit value of the electric drive unit results from the reduced current limit function. As the maximum current limit function may be a function of a drive pedal speed request, the drive pedal speed request value is mapped to the respective reduced current limit value by "inserting" the drive pedal speed request value in the reduced current limit function. The step of mapping each drive pedal speed request value provided by the operated drive pedal to a respective reduced current limit value of the electric drive unit results from the reduced current limit function. As the reduced current limit function may be a function of a drive pedal speed request, the drive pedal speed request value is mapped to the respective reduced current limit value by "inserting" the drive pedal speed request value in the reduced current limit function. However, it is also conceivable that this mapping is done using a table or similar, wherein a drive pedal speed request value is assigned to a reduced current limit value such as the mapping is rather a selecting the reduced current limit value assigned to the respective drive pedal speed request value.

The step of mapping each drive pedal speed request value provided by the operated drive pedal to a respective desired speed value. For example, the mapping may be realized by a linear function, wherein the desired speed is a linear function of the drive pedal speed request. For example, this function could be defined in such a manner that a drive pedal speed request value of 0% corresponds to a speed of 0 kph and a drive pedal speed request value of 100% corresponds to a maximum authorised speed of the vehicle. However, it is also conceivable that this mapping is done using a table or similar, wherein a drive pedal speed request value is assigned to a desired speed value such as the mapping is rather a selecting the desired speed value assigned to the respective drive pedal speed request value.

In some embodiments, the mapping step is carried out continuously while controlling the electric drive unit.

The method comprises in a further step to determine the actual drive pedal speed request value. The actual drive pedal speed request value may be determined by sensors as elaborated above.

Finally, the method comprises the step of controlling the electric drive unit. The electric drive unit may be controlled depending on the determined reduced current limit function of the electric drive unit if the desired speed value mapped to the determined actual drive pedal speed request value is similar or equal to the determined actual speed value of the electric drive unit. If the desired speed value mapped to the determined actual drive pedal speed request value is larger than the determined actual speed value of the electric drive unit, the electric drive unit is controlled depending on the determined maximum current limit function of the electric drive unit.

In some embodiments, similar means that the electric drive unit may be controlled depending on the determined reduced current limit function of the electric drive unit if the desired speed value mapped to the determined actual drive pedal speed request value is in a range of an upper speed threshold value and of a lower speed threshold value, wherein the upper speed threshold value is larger than the desired speed value and the lower speed threshold value is smaller than the desired speed value.

In particular, the electric drive unit is controlled in a speed control mode if the electric drive unit is controlled depending on the determined reduced current limit function of the electric drive unit. Further, in particular, the electric drive unit is controlled in a torque control mode if the electric drive unit is controlled depending on the determined maximum current limit function of the electric drive unit. Thus, in some embodiments, as long as the current provided to operate the electric drive unit is sufficient to reach the desired speed value that is mapped to the determined actual drive pedal speed request value, the electric drive unit is controlled via speed control while the current provided to the electric drive unit is limited in accordance with the reduced current limit function.

In some embodiments, it is to be understood that the electric drive unit is controlled depending on the determined reduced current limit function and/or depending on the determined maximum current limit function via the electric energy storage system.

This kind of control may prevent the vehicle to provide maximum torque at low speeds and, thus, may prevent unwanted wheel slips and missing controllability of the vehicle. Thus, this kind of control may improve the control of the electric drive unit. Further, the optimum control of both speed and torque provided by the electric drive unit may be enabled/improved by this kind of control.

As to further advantages, examples and details of the method, reference is made to the corresponding aspect and examples of the computer program product, the non-transitory computer readable medium, the control unit, the electric drive unit, and the vehicle described herein below.

In some examples, optionally, the desired speed value is a speed in a full load condition of the vehicle. In some embodiments, this means that the drive train, i.e. the electric drive unit, of the vehicle is running at the maximum power over the complete speed range of the electric drive unit.

In particular, running the electric drive unit at a speed in the full load condition, i.e. at maximum power over its entire speed range, the acceleration and responsiveness of the electric drive unit is improved. Further, operating at maximum power may enable the vehicle to quickly reach and maintain the desired speed value, resulting in a more dynamic driving experience. Additionally, this configuration may allow for better utilization of the available power and torque of the electric drive unit, providing a more efficient and effective use of the drive unit's capabilities.

In some examples, optionally, it is provided that the electric drive unit is a direct current electric drive unit or an asynchronous current electric drive unit.

It is to be understood that benefits addressed above usually apply to the electric drive unit being a direct current electric drive unit or an asynchronous current electric drive unit. These may be realized regardless of the type of drive utilized. This universality effect highlights the broad applicability of this disclosure and its advantages and the potential for widespread implementation in various electrically powered systems.

In some examples, optionally, the method comprises the step of determining a threshold drive pedal speed request value. The threshold drive pedal speed request value represents a threshold speed of the electric drive unit. In some embodiments, the step of determining a threshold drive pedal speed request value comprises the step of determining a first threshold drive pedal speed request value and/or determining a second threshold drive pedal speed request value.

In some embodiments, when reaching the threshold drive pedal speed request value or above the method controls the electric drive unit to run at the maximum value of the reduced limit current function or the maximum limit current function. In some embodiments, the threshold drive pedal speed request value is determined prior the use of the electric drive unit. For example, the user of the electric drive unit may determine the threshold drive pedal speed request value. Additionally or alternatively, the threshold drive pedal speed request value may be determined by the manufacturer and/or mechanics of a workshop.

It is to be understood that the determination of the threshold value is a process that may occur prior to the implementation of the electric drive unit. Usually, the threshold value may be based on specific requirements and desired performance characteristics of the application for which the electric drive unit is intended. This threshold value can serve as a reference point that may allow the electric drive unit to operate within a prescribed parameter setting, optimizing its overall performance and ensuring it meets the needs of the target application.

In some embodiments, as a consequence of the mapped current or torque to the drive pedal speed request, the maximum current limit value is larger than the reduced current limit value if the determined actual drive pedal speed request value is larger than the threshold drive pedal speed request value. This enables the operator to control the torque of the drive line with the drive pedal, for example with a blocked drivetrain while approaching a pile and filling a bucket and to still have the advantages of the speed controlled drivetrain in normal operation. Further, as a consequence of the mapped current or torque to the drive pedal speed request, the maximum current limit value is equal or similar to the reduced current limit value if the determined actual drive pedal speed request value is equal to or smaller than the threshold drive pedal speed request value, thus, resulting in a normal speed controlled drive line.

In some examples, optionally, the maximum current limit value is larger than the reduced current limit value if the determined actual drive pedal speed request value is smaller than the threshold drive pedal speed request value. In some embodiments, additionally or alternatively, the maximum current limit value is equal or similar to the reduced current limit value if the determined actual drive pedal speed request value is equal to or larger than the threshold drive pedal speed request value. A control unit may be configured to compare the determined actual drive pedal speed request value and the threshold drive pedal speed request value and control the electric drive unit accordingly.

In this example, the approach of controlling the electric drive unit based on the determined maximum current limit and the reduced current limit functions may evolve in several benefits. In particular, when the actual drive pedal speed request value is equal to or larger than the threshold drive pedal speed request value, utilizing the maximum current limit function can provide improved acceleration and responsiveness of the electric drive unit, enabling the vehicle to quickly reach and maintain desired speeds.

In some examples, optionally, controlling the electric drive unit depends on the determined maximum current limit function of the electric drive unit if the determined actual drive pedal speed request value is equal to or larger than the threshold drive pedal speed request value. In some embodiments, additionally or alternatively, controlling the electric drive unit depends on the determined reduced current limit function of the electric drive unit if the determined actual drive pedal speed request value is smaller than the threshold drive pedal speed request value.

According to some of these examples, the approach of controlling the electric drive unit based on the determined maximum current limit and reduced current limit functions may evolve in several benefits as well. In particular, when the actual drive pedal speed request value is equal to or larger than the threshold drive pedal speed request value, utilizing the maximum current limit function can provide improved acceleration and responsiveness of the electric drive unit, enabling the vehicle to quickly reach and maintain desired speeds.

In some examples, optionally, a slope of the reduced current limit function is equal to or smaller than a slope of the maximum current limit function if the determined actual drive pedal speed request value is smaller than the threshold drive pedal speed request value. In some embodiments, additionally or alternatively, the slope of the reduced current limit function is equal to the slope of the maximum current limit function if the determined actual drive pedal speed request value is equal to or larger than the threshold drive pedal speed request value.

By defining or tuning the slopes of the limit functions, the specific torque bandwidth may be calibrated and different machine characteristics can be set up in a beneficial manner.

In some examples, optionally, the slope of the reduced current limit function and the slope of the maximum current limit function is larger than zero and, preferably constant, if the determined actual drive pedal speed request value is smaller than the threshold drive pedal speed request value. In some embodiments, additionally or alternatively, if the determined actual drive pedal speed request value is equal to or larger than the threshold drive pedal speed request value the slope of the reduced current limit function and the slope of the maximum current limit function is zero.

By defining or tuning the slopes of the limit functions, the specific torque bandwidth may be calibrated and different machine characteristics can be set up in a beneficial manner.

In some examples, optionally, the method comprises the steps of determining a torque adjust value for adjusting the current limit value of the reduced current limit function depending on the speed value, and adjusting the current limit value of the reduced current limit function depending on the determined torque adjust value.

This configuration may allow for better utilization of the available power and torque, providing a more efficient and effective use of the electric drive unit's capabilities.

According to a further aspect of the disclosure, the object is achieved by a computer program product comprising program code for performing, when run on a computer and/or a control unit, the method according to the aspect and its embodiments of the method described herein above.

As to the advantages, examples and details of the computer program product, reference is made to the corresponding aspects and examples of the method and/or the control unit and/or the non-transitory computer-readable storage medium and/or the electric drive unit and/or the vehicle described herein above and/or below.

According to a further aspect of the disclosure, the object is achieved by a non-transitory computer-readable storage medium comprising instructions, which when executed by a computer and/or the control unit, cause the computer and/or the control unit to perform the method according to the aspect and its embodiments of the method described herein above.

As to the advantages, examples and details of the non-transitory computer-readable storage medium, reference is made to the corresponding aspects and examples of the method and/or the control unit and/or the computer program product and/or the electric drive unit and/or the vehicle described herein above and/or below.

According to a further aspect of the disclosure, the object is achieved by a control unit for controlling an electric drive unit of a vehicle, in particular of a construction machine such as a wheel loader, the control unit being configured to perform the steps of the method according to the aspect and its embodiments of the method described herein above.

As to the advantages, examples and details of the control unit, reference is made to the corresponding aspects and examples of the method and/or the computer program product and/or the non-transitory computer-readable storage medium and/or the electric drive unit and/or the vehicle described herein above and/or below.

According to a further aspect of the disclosure, the object is achieved by an electric drive unit comprising a control unit described herein above.

As to the advantages, examples and details of the electric drive unit, reference is made to the corresponding aspects and examples of the method and/or the computer program product and/or the non-transitory computer-readable storage medium and/or the control unit and/or the vehicle described herein above and/or below.

According to a further aspect of the disclosure, the object is achieved by a vehicle, in particular a construction machine such as a wheel loader, the vehicle comprising an electric drive unit as described herein above and/or a control unit as described herein above and/or a drive pedal, wherein the electric drive unit and/or the control unit and/or the drive pedal are signaling coupled.

As to the advantages, examples and details of the vehicle, reference is made to the corresponding aspects and examples of the method and/or the control unit and/or the computer program product and/or the non-transitory computer readable storage medium and/or the electric drive unit described herein above.

Examples of the disclosed aspects are now described below with reference to the drawings. These are not necessarily intended to show the preferred embodiments of the disclosure to scale; rather, where useful for explanation, the drawings are in schematized and/or slightly distorted form. With regard to additions to the gauges directly recognizable from the drawings, reference is made to the relevant prior art. It should be borne in mind that a wide variety of modifications and changes concerning the shape and detail of an example can be made without departing from the general idea of the disclosure. The features of the disclosure disclosed in the description, in the drawings as well as in the claims may be essential for the further development of the disclosure both individually and in any combination. In addition, all combinations of at least two of the features disclosed in the description, the drawings and/or the claims fall within the scope of the disclosure. The general idea of the disclosure is not limited to the exact form or detail of the examples shown and described below, or limited to any subject matter that would be limited as compared to the subject matter claimed in the claims. In the case of stated design ranges, values lying within the stated limits are also intended to be disclosed as limiting values and to be capable of being used and claimed as desired. For simplicity, identical reference signs are used below for identical or similar parts or parts with identical or similar function.

BRIEF DESCRIPTION OF THE DRAWINGS

Examples are described in more detail below with reference to the appended drawings.

In the drawings.

DETAILED DESCRIPTION

The detailed description set forth below provides information and examples of the disclosed technology with sufficient detail to enable those skilled in the art to practice the disclosure.

Figure 1:
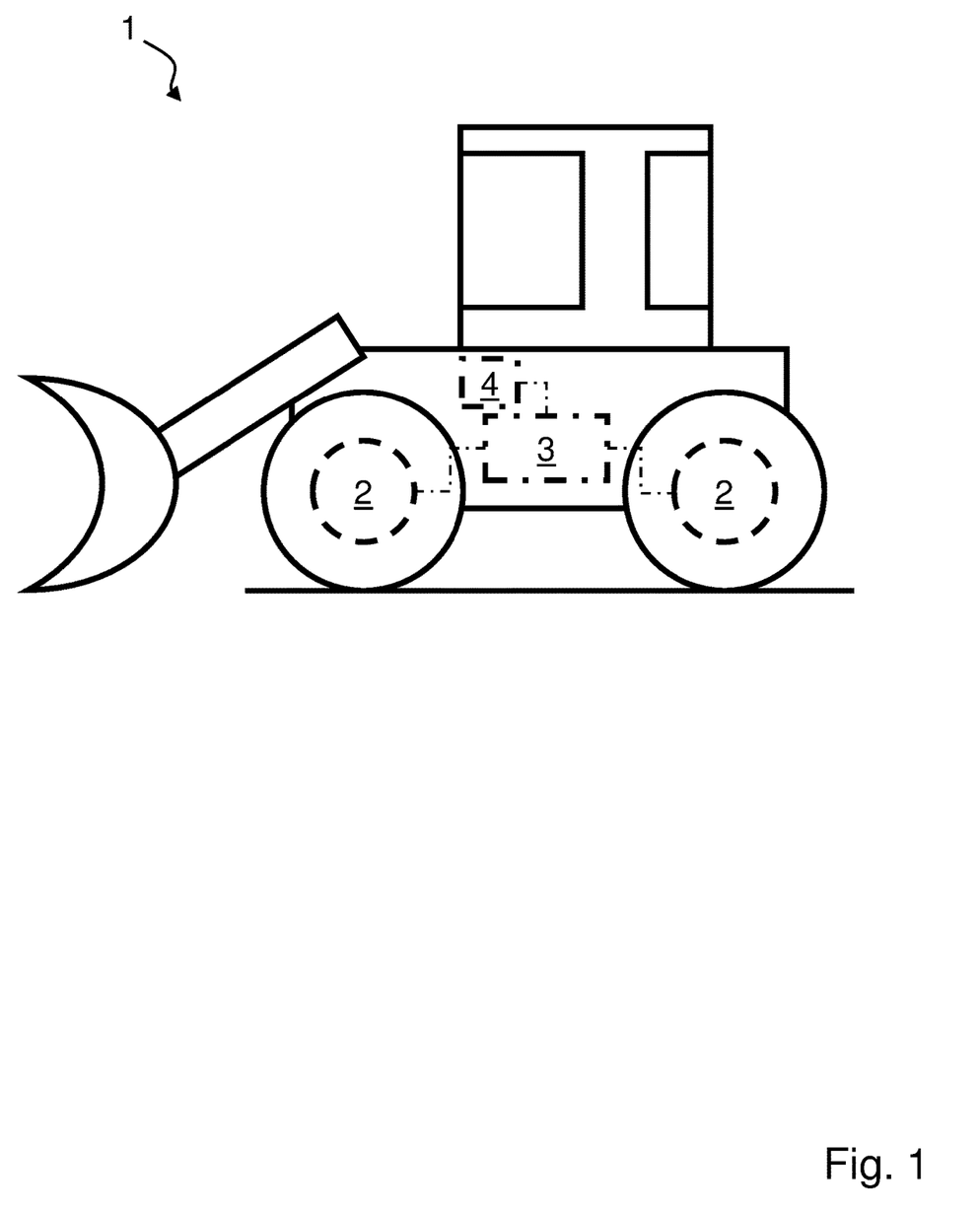
FIG. 1 is an exemplary side view of a wheel loader according to an example.

FIG. 1 is an exemplary side view of a wheel loader 1 according to an example. The wheel loader 1 comprises four wheels each coupled to an electric drive unit 2 for driving the wheel loader 1. The electric drive units 2 may be direct current electric drive units 2 or asynchronous current electric drive units 2. Further, the wheel loader 1 comprises a drive pedal 4. The electric drive unit 2 and, thus, the wheel loader 1 is driven depending on the degree of operation of the drive pedal 4. The degree of operation of the drive pedal 4 may be measured by means of a sensor (not shown), for example an angle sensor or alike. In this embodiment, the wheel loader 1 comprises a control unit 3 for controlling the electric drive unit. For this purpose, the control unit is signaling coupled with the drive pedal 4 or the respective sensor (not shown) that measures the degree of operation of the drive pedal 4, the electric drive unit 2 for controlling the electric drive unit depending on the degree of operation of the drive pedal 4. This allows that the control unit receives all necessary data from the respective sensors and the electric drive unit for controlling the electric drive unit.

To control the electric drive unit 2 by means of the control unit 3, the control unit 3 is configured to perform the steps of a method 1000 for controlling the electric drive unit 2. Accordingly, the control unit may comprise microprocessors, data storages and interfaced to transmit data for controlling the electric drive unit. In particular, the control unit may comprise a non-transitory computer readable storage medium carrying a computer program comprising program code means for performing the steps of the method 1000 for controlling the electric drive unit 2. A computer program product may comprise these program code means.

Figure 2:
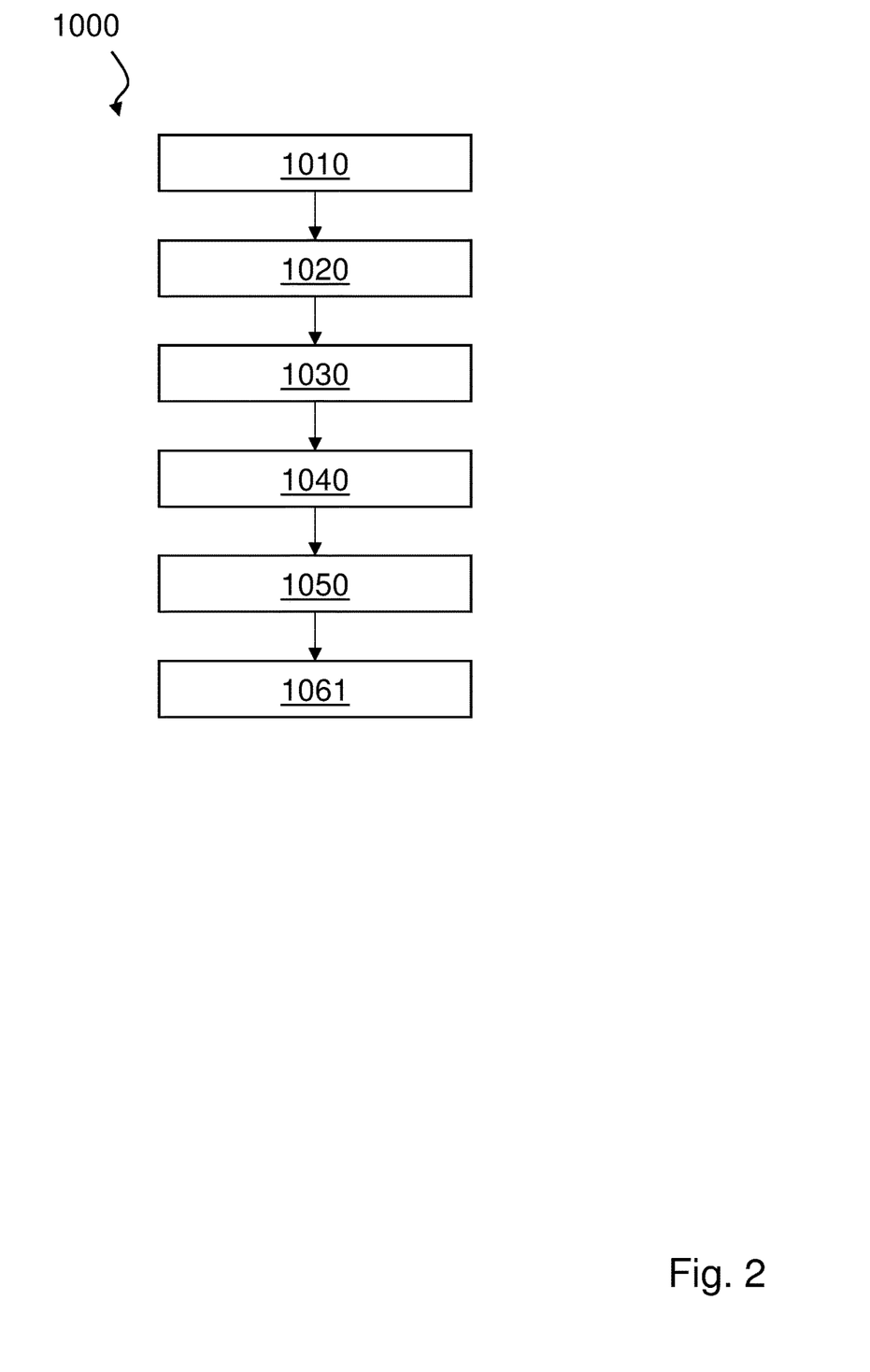
FIG. 2 is an exemplary block diagram of a method according to an example.
Figure 3:
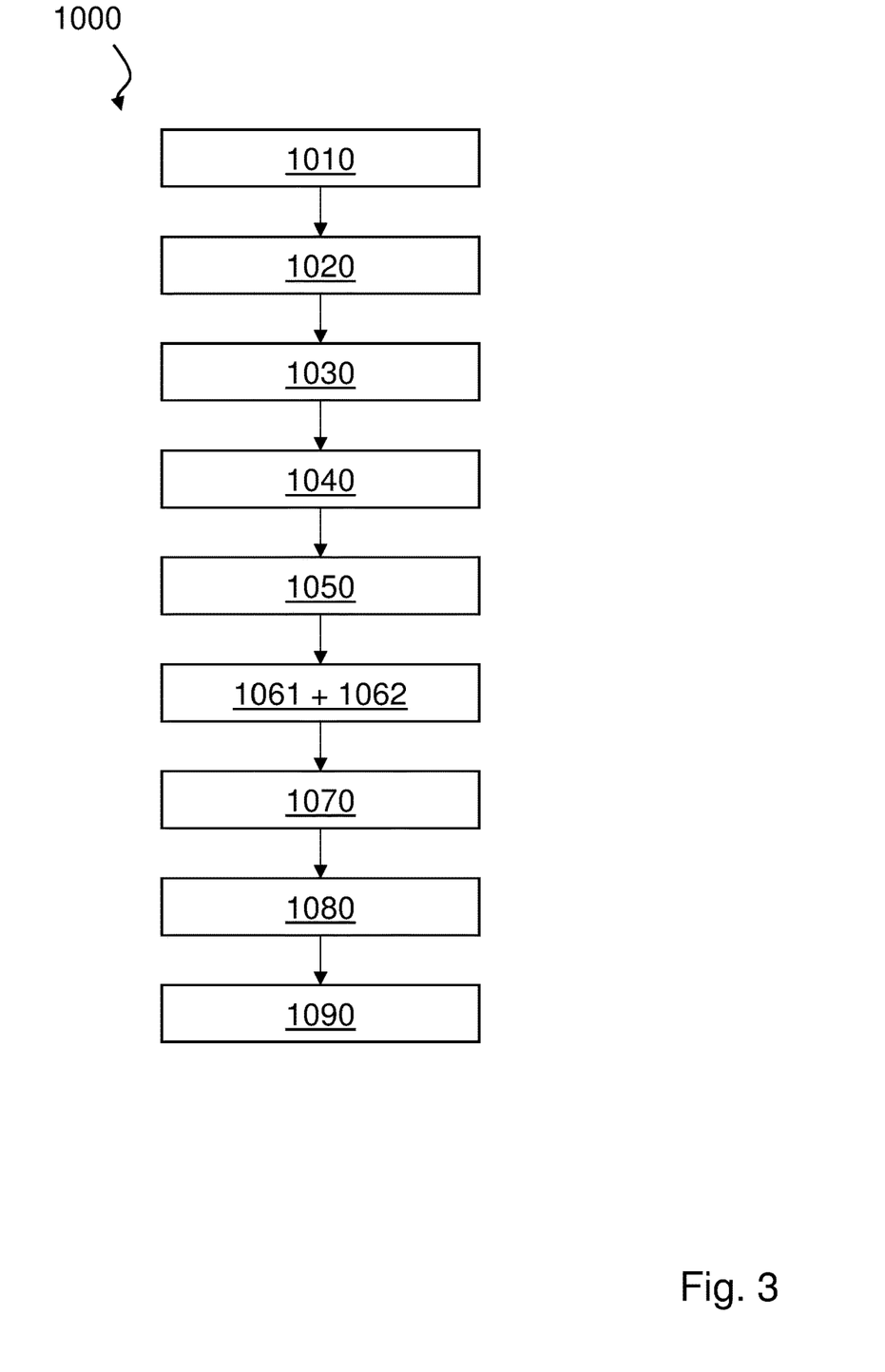
FIG. 3 is an exemplary block diagram of a method according to a second example.

Two examples of the method 1000 are described herein below. FIG. 2 is an exemplary block diagram of the method 1000 according to a first example and FIG. 3 is an exemplary block diagram of the method 1000 according to a second example. As may be appreciated from the description below, the second example of the method 1000 is based on the first example of the method 1000 comprising additional steps as will be elaborated in detail below.

Both examples of the method described herein enable controlling of the electric drive unit in such a manner that unwanted wheel slips are prevented, which would lead to missing controllability, for example when the wheel loader approaches a pile to break our material or if the ground is slippery. Thus, in both examples, the control of the electric drive unit may be improved. In particular, the optimum control of both speed and torque provided by the electric drive unit may be enabled/improved by this kind of control.

The method according to the first example as depicted in the exemplary block diagram in FIG. 2 comprises the step of determining 1010 an actual speed value of the electric drive unit. Accordingly, the wheel loader may comprise some kind of sensor to detect the actual speed of the electric drive unit.

Further, the method comprises the step of determining 1020 a maximum current limit function MAX of the electric drive unit 2. The maximum current limit function MAX represents a maximum current limit value of the electric drive unit 2 depending on the actual drive pedal speed request value RV.

As further step, the method comprises the step of determining 1030 a reduced current limit function MIN of the electric drive unit 2. The reduced current limit function MIN represents a reduced current limit value of the electric drive unit 2 depending on the actual drive pedal speed request value RV.

Figure 4A:
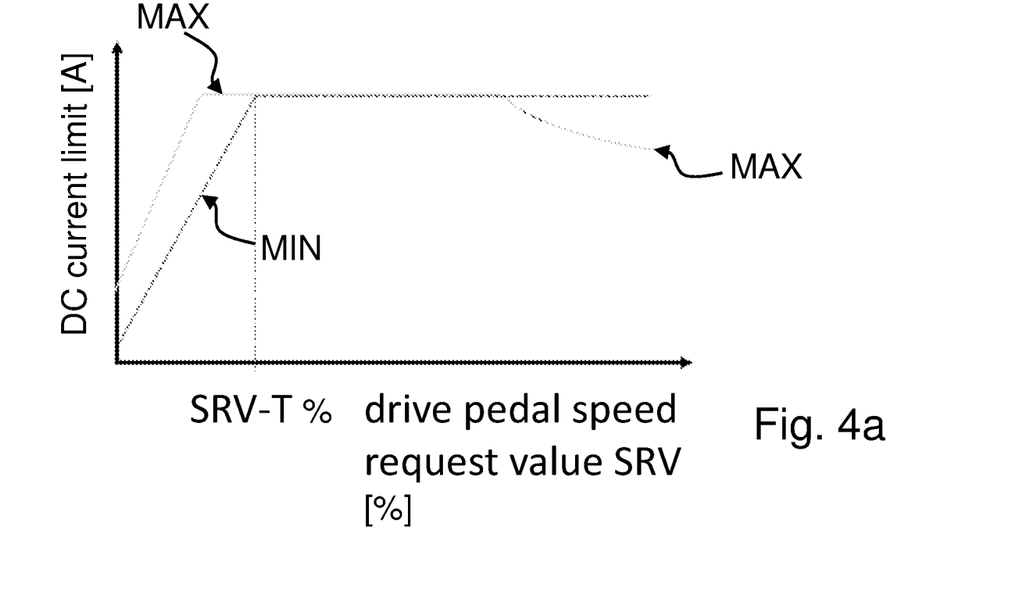
FIG. 4a,b are exemplary diagrams of current limit functions depending on the current (ordinate axis) and speed or drive pedal speed request (abscissa axis) according to an example.

A plot of the maximum current limit function MAX and of the reduced current limit function MIN are shown in FIG. 4*a*. In the plot, the abscissa represents the drive pedal speed request value RV and the ordinate represents the current limit. The drive pedal speed request value RV is zero at the point where the ordinate and abscissa intersect and increases to the right. The drive pedal speed request value RV being zero means that the drive pedal 4 is not operated. With increasing degree of operation of the drive pedal 4, the drive pedal speed request value RV increases up to a maximum of 100%.

It can be seen that both, the maximum current limit function MAX and the reduced current limit function MIN first increase in a linear manner depending on the degree of operation of the drive pedal and, thus, depending on the drive pedal speed request value RV in a first section if the determined actual drive pedal speed request value SRV-A is smaller than the threshold drive pedal speed request value SRV-T. In a second section, the maximum current limit function MAX and the reduced current limit function MIN are constant, i.e. independent of the degree of operation of the drive pedal and, thus, independent on the drive pedal speed request value RV, if the determined actual drive pedal speed request value SRV-A is equal to or larger than the threshold drive pedal speed request value SRV-T. In the first section, a slope of the reduced current limit function MIN is smaller than a slope of the maximum current limit function MAX. In the second section, the slope of the reduced current limit function MIN is equal to the slope of the maximum current limit function MAX.

In a further step of the method, each drive pedal speed request value SRV provided by the operated drive pedal 4 is mapped to a respective maximum current limit value of the electric drive unit 2, to a respective reduced current limit value of the reduced current limit function MIN, and to a respective desired speed value.

Further, the method comprises the step of determining 1050 the actual drive pedal speed request value SRV-A.

Finally, the electric drive unit is controlled 1061. If the desired speed value DS that is mapped to the determined actual drive pedal speed request value SRV-A is similar or equal to the determined actual speed value of the electric drive unit 2, the electric drive unit 2 is controlled depending on the determined reduced current limit function MIN of the electric drive unit 2. However, if the desired speed value mapped to the determined actual drive pedal speed request value is larger than the determined actual speed value of the electric drive unit 2, the electric drive unit 2 is controlled depending on the determined maximum current limit function MAX of the electric drive unit 2.

In addition to the steps of the first example of the method disclosed in FIG. 2, the second example of the method depicted in FIG. 3 comprises the step of determining 1070 a threshold drive pedal speed request value SRV-T representing a threshold speed of the electric drive unit 2.

The maximum limit function MAX illustrated in FIG. 4*a* represents a common electric drive unit powered with a constant voltage supply and with variable speed controlled inverters.

In FIG. 4*a*, it can be seen that the maximum current limit value of the maximum current limit function MAX increases in a linear manner with increasing degree of operation of the drive pedal until it reaches a threshold drive pedal speed request value. As soon as the degree of operation of the drive pedal 4 until reaches the threshold drive pedal speed request value SRV-T, the maximum current limit value of the maximum current limit function MAX is constant, i.e. independent of the degree of operation of the drive pedal.

Further, in FIG. 4*a*, it can be seen that the reduced current limit function MIN increases in a linear manner with increasing degree of operation of the drive pedal until it reaches a threshold drive pedal speed request value. As soon as the degree of operation of the drive pedal 4 until reaches the threshold drive pedal speed request value SRV-T, the reduced current limit value of the reduced current limit function MIN is constant, i.e. independent of the degree of operation of the drive pedal 4.

In this second example, controlling 1062 the electric drive unit 2 depends on the determined maximum current limit function MAX of the electric drive unit 2 if the determined actual drive pedal speed request value SRV-A is equal to or larger than the threshold drive pedal speed request value SRV-T, and depends on the determined reduced current limit function MIN of the electric drive unit 2 if the determined actual drive pedal speed request value SRV-A is smaller than the threshold drive pedal speed request value SRV-T.

In this second example of the method depicted in FIG. 3, the method may comprise the steps of determining 1080 a torque adjust value for adjusting the current limit value of the reduced current limit function MIN depending on the speed value, and adjusting 1090 the current limit value of the reduced current limit function MIN depending on the determined torque adjust value.

Figure 4B:
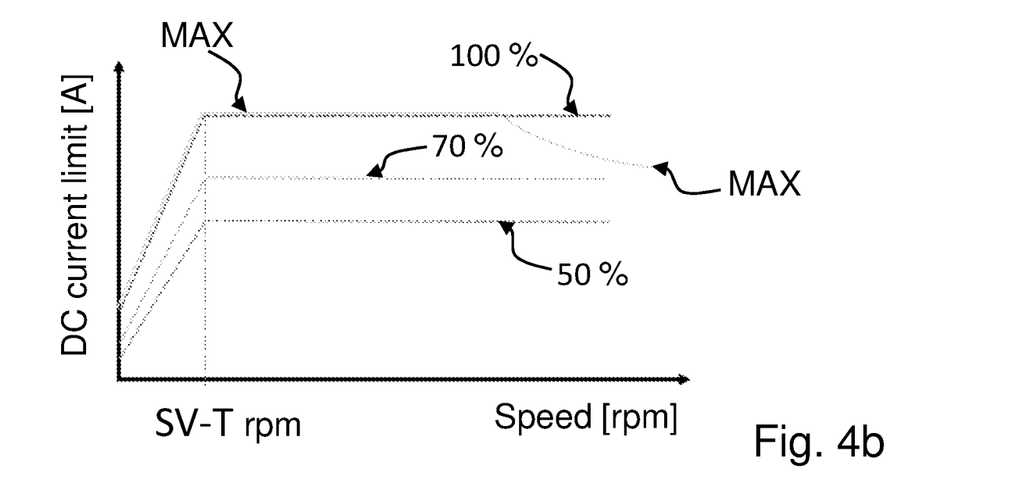

In FIG. 4*b*, it can be seen that the torque adjust value may be determined as 100% such that the current limit function is equal to the maximum current limit function MAX. In some embodiments, the torque adjust value may be reduced and determined as, for example, 70% or 50% of the maximum current limit function MAX. In consequence the current limit value of the reduced current limit function MIN is adjusted 1090 depending on the determined torque adjust value.

Figure 5A:
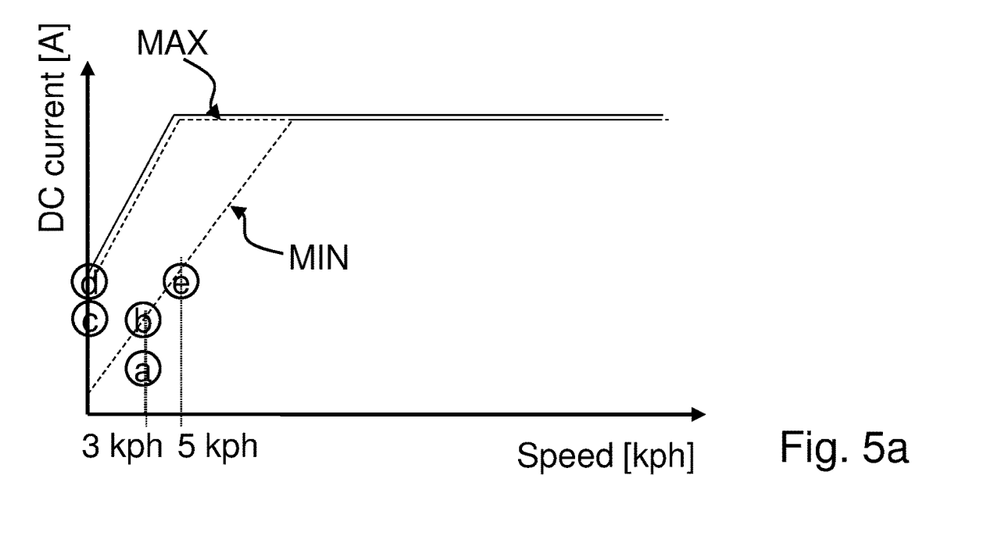
FIG. 5a,b are further exemplary diagrams of current limit functions depending on the current (ordinate axis) and speed or drive pedal speed request (abscissa axis) according to an example.
Figure 5B:
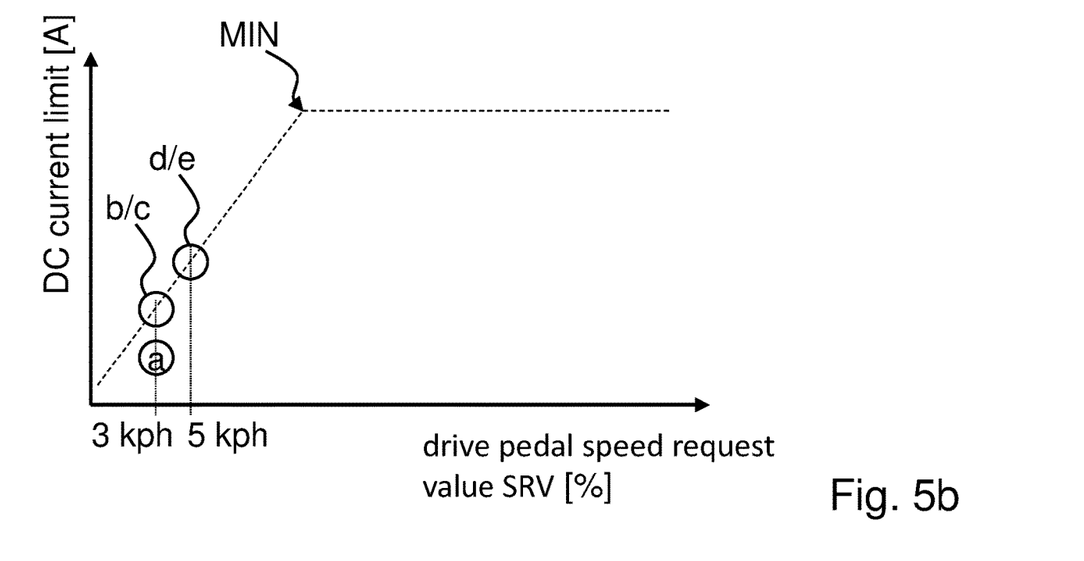

Based on FIGS. 5*a* and 5*b*, which show exemplary diagrams of current limit functions depending on the current (ordinate axis) and speed or drive pedal speed request (abscissa axis) according to an example, the method described for controlling an electric drive unit 2 of an electric vehicle 1, such as a wheel loader is visualized based on circled "a", "b", "c", "d" and "e" indicated in FIGS. 5*a* and 5*b*.

In this example, "a" represents a wheel loader driving in a flat ground at 3 kph with a "normal" drive resistance. The "normal" drive resistance is to be understood as a rolling resistance on a flat surface and a wind resistance, but not, for example, a situation in which the bucket of the wheel loader penetrates a sand hill or where the wheel loader is driving uphill or something alike. In this case the desired speed value DS that is mapped to the respective drive pedal speed request value SRV provided by the operated drive pedal 4 is pretty much equal to the actual speed value. Accordingly, the electric drive unit is controlled depending on the determined reduced current limit function MIN of the electric drive unit 2 in a speed control mode.

In case the wheel loader approaches a sand hill and the bucket of the wheel loader digs into the sand hill, the resistance increases while the drive pedal speed request value SRV and the desired speed value mapped to the drive pedal speed request value SRV. Thus, in order to maintain the actual drive speed value equal to the desired speed value of 3 kph the traction torque provided to the wheels of the wheel loader needs to be increased. Therefore, the current provided to the electric drive unit is increased up to the respective minimum current limit value of the electric drive unit 2 mapped to the unchanged actual drive pedal speed request value SRV provided by the operated drive pedal 4 if needed. This is the change in current from point "a" to point "b" along the dotted vertical line in FIGS. 5a and 5b.

If the resistance of the sand hill is now so high because the bucket of the wheel loader is already pushed so far into the sand hill that even at the respective minimum current limit value of the electric drive unit 2 the torque generated is not sufficient to maintain the desired speed value of 3 kph mapped to the unchanged drive pedal speed request value SRV, the speed of the electric drive unit drops, while the current provided to the electric drive unit remains the same. This is the change in current from point "b" to point "c" along the dotted vertical line in FIG. 5a. As the current provided to the electric drive unit and the drive pedal speed request value SRV do not change, point "b" and point "c" are the same in FIG. 5b.

Consequently, the desired speed valued mapped to the respective actual speed request value is larger than the actual speed value of the vehicle. Accordingly, the electric drive unit is now controlled depending on the determined maximum current limit function MAX of the electric drive unit 2 in a torque control mode.

If the drive pedal speed request value SRV is now increased in such a manner that it represents a desired speed value at 5 kph, the maximum allowed current, i.e. torque for traction, increases. This is indicated by the change from point "c" and point "d" indicated in FIG. 5a.

If the resulting higher current, i.e. torque is sufficient to accelerate the machine against the drive resistance due to the bucket digged into the sand hill, the electric drive unit increases its speed. Depending on the resistance and torque, the actual speed value of the electric drive unit may reach the desired speed value of 5 kph mapped to the actual drive pedal speed request value SRV. This is indicated in the change from "d" and point "e" in FIG. 5a.

The operational actions described in any of the exemplary aspects herein are described to provide examples and discussion. The actions may be performed by hardware components, for example the control unit, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

Further examples of the disclosure are disclosed herein below:

1. A method for controlling an electric drive unit of a vehicle, in particular a construction machine such as a wheel loader,
wherein the vehicle comprises
   a drive pedal for providing an actual drive pedal speed request value for operating the electric drive unit depending on the degree of operation of the drive pedal, and
   the electric drive unit being signaling coupled to the drive pedal via a control unit, wherein the electric drive unit is configured for driving the vehicle depending on the actual drive pedal speed request value,
the method comprising the steps of:
   determining an actual speed value of the electric drive unit;
   determining a maximum current limit function of the electric drive unit, wherein the maximum current limit function represents a maximum current limit value of the electric drive unit for driving the electric drive unit depending on the actual drive pedal speed request value;
   determining a reduced current limit function of the electric drive unit, wherein the reduced current limit function represents a reduced current limit value of the electric drive unit for driving the electric drive unit depending on the actual drive pedal speed request value; wherein
   mapping each drive pedal speed request value provided by the operated drive pedal
      to a respective maximum current limit value of the electric drive unit; and
      to a respective reduced current limit value of the reduced current limit function; and
      to a respective desired speed value; and
   determining the actual drive pedal speed request value (RV);
   controlling the electric drive unit
      depending on the determined reduced current limit function of the electric drive unit if the desired speed value mapped to the determined actual drive pedal speed request value (RV) is similar or equal to the determined actual speed value of the electric drive unit; and
      depending on the determined maximum current limit function of the electric drive unit if the desired speed value mapped to the determined actual drive pedal speed request value is larger than the determined actual speed value of the electric drive unit.

2. The method according to the preceding example 1, wherein the desired speed value is a speed in a full load condition of the vehicle.

3. The method according to any one of the preceding examples 1 or 2, wherein the electric drive unit is a direct current electric drive unit.

4. The method according to any one of the preceding examples 1 or 2, wherein the electric drive unit is an asynchronous current electric drive unit.

5. The method according to any one of the preceding examples 1 to 4, comprising the step of determining a threshold drive pedal speed request value (SRV-T) representing a threshold speed of the electric drive unit.

6. The method according to the preceding example 5, wherein
   the maximum current limit value is larger than the reduced current limit value if the determined actual drive pedal speed request value (SRV-A) is smaller than the threshold drive pedal speed request value (SRV-T).

7. The method according to any one of the preceding examples 5 or 6, wherein the maximum current limit value is equal or similar to the reduced current limit value if the determined actual drive pedal speed request value (SRV-A) is equal to or larger than the threshold drive pedal speed request value (SRV-T).
8. The method according to any one of the preceding examples 5 to 7, wherein controlling the electric drive unit depends on
    the determined maximum current limit function of the electric drive unit if the determined actual drive pedal speed request value (SRV-A) is equal to or larger than the threshold drive pedal speed request value (SRV-T).
9. The method according to any one of the preceding examples 5 to 8, wherein controlling the electric drive unit depends on
    the determined reduced current limit function of the electric drive unit if the determined actual drive pedal speed request value (SRV-A) is smaller than the threshold drive pedal speed request value (SRV-T).
10. The method according to any one of the preceding examples 5 to 9, wherein
    a slope of the reduced current limit function is equal to or smaller than a slope of the maximum current limit function if the determined actual drive pedal speed request value (SRV-A) is smaller than the threshold drive pedal speed request value (SRV-T).
11. The method according to any one of the preceding examples 5 to 10, wherein
    the slope of the reduced current limit function is equal to the slope of the maximum current limit function if the determined actual drive pedal speed request value (SRV-A) is equal to or larger than the threshold drive pedal speed request value (SRV-T).
12. The method according to any one of the preceding examples 5 to 11, wherein
    if the determined actual drive pedal speed request value (SRV-A) is smaller than the threshold drive pedal speed request value (SRV-T) the slope of the reduced current limit function and the slope of the maximum current limit function is larger than zero and, preferably, constant; and/or
13. The method according to any one of the preceding examples 5 to 12, wherein
    if the determined actual drive pedal speed request value (SRV-A) is equal to or larger than the threshold drive pedal speed request value (SRV-T) the slope of the reduced current limit function and the slope of the maximum current limit function is zero.
14. The method according to any one of the preceding examples 1 to 13, comprising the steps of determining a torque adjust value for adjusting the current limit value of the reduced current limit function depending on the speed value.
15. The method according to preceding example 14, comprising the steps of
    adjusting the current limit value of the reduced current limit function depending on the determined torque adjust value.
16. A computer program product comprising program code means for performing the steps of any of examples 1-15 when said program is run on a computer and/or a control unit.
17. A non-transitory computer readable storage medium carrying a computer program comprising program code means for performing the steps of any of examples 1-15 when said program product is run on a computer and/or a control unit.
18. A control unit for controlling an electric drive unit of a vehicle, in particular a construction machine such as a wheel loader, the control unit being configured to perform the steps of the method according to any of examples 1-15.
19. An electric drive unit comprising a control unit according to preceding example 18.
20. A vehicle comprising an electric drive unit according to preceding example 19 and/or a control unit according to preceding example 18 and/or a drive pedal, wherein the electric drive unit and/or the control unit and/or the drive pedal are signaling coupled.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

Any computer systems, control units, code modules, computer-implemented methods, computer readable media, and computer program products are also disclosed herein may be associated with the above discussed technical benefits.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. A method for controlling an electric drive unit of a vehicle,
   wherein the vehicle comprises:
      a drive pedal for providing an actual drive pedal speed request value (SRV) for operating the electric drive unit depending on the degree of operation of the drive pedal, and
      the electric drive unit being signaling coupled to the drive pedal via a control unit, wherein the electric drive unit is configured for driving the vehicle depending on the actual drive pedal speed request value (SRV),
   the method comprising the steps of:
      determining an actual speed value of the electric drive unit;
      determining the actual drive pedal speed request value (SRV) depending on the degree of operation of the drive pedal;
      determining a maximum current limit function (MAX) of the electric drive unit, wherein the maximum current limit function represents a maximum current limit value of the electric drive unit depending on the actual drive pedal speed request value (SRV);
      determining a reduced current limit function (MIN) of the electric drive unit, wherein the reduced current limit function (MIN) represents a reduced current limit value of the electric drive unit depending on the actual drive pedal speed request value (SRV);
      mapping each drive pedal speed request value provided by the operated drive pedal
         to a respective maximum current limit value of the electric drive unit; and
         to a respective reduced current limit value of the reduced current limit function (MIN); and
         to a respective desired speed value (DS); and
      controlling the electric drive unit
         depending on the determined reduced current limit function (MIN) of the electric drive unit if the desired speed value (DS) mapped to the determined actual drive pedal speed request value (SRV) is
            similar or equal to the determined actual speed value of the electric drive unit; and
         depending on the determined maximum current limit function (MAX) of the electric drive unit if the desired speed value mapped to the determined actual drive pedal speed request value is larger than the determined actual speed value of the electric drive unit.

2. The method according to claim 1, wherein the desired speed value is a speed in a full load condition of the vehicle.

3. The method according to claim 1, wherein the electric drive unit is a direct current electric drive unit or an asynchronous current electric drive unit.

4. The method according to claim 1, comprising the step of determining a threshold drive pedal speed request value (SRV-T) representing a threshold speed of the electric drive unit.

5. The method according to claim 4, wherein
   the maximum current limit value is larger than the reduced current limit value if the determined actual drive pedal speed request value (SRV-A) is smaller than the threshold drive pedal speed request value (SRV-T), and/or
   the maximum current limit value is equal or similar to the reduced current limit value if the determined actual drive pedal speed request value (SRV-A) is equal to or larger than the threshold drive pedal speed request value (SRV-T).

6. The method according to claim 4, wherein controlling the electric drive unit depends on
   the determined maximum current limit function (MAX) of the electric drive unit if the determined actual drive pedal speed request value (SRV-A) is equal to or larger than the threshold drive pedal speed request value (SRV-T), and/or
   the determined reduced current limit function (MIN) of the electric drive unit if the determined actual drive pedal speed request value (SRV-A) is smaller than the threshold drive pedal speed request value (SRV-T).

7. The method according to claim 4, wherein
   a slope of the reduced current limit function is equal to or smaller than a slope of the maximum current limit function if the determined actual drive pedal speed request value (SRV-A) is smaller than the threshold drive pedal speed request value (SRV-T); and/or
   the slope of the reduced current limit function is equal to the slope of the maximum current limit function if the determined actual drive pedal speed request value (SRV-A) is equal to or larger than the threshold drive pedal speed request value (SRV-T).

8. The method according to claim 4, wherein
   if the determined actual drive pedal speed request value (SRV-A) is smaller than the threshold drive pedal speed request value (SRV-T) the slope of the reduced current limit function and the slope of the maximum current limit function is larger than zero; and/or
   if the determined actual drive pedal speed request value (SRV-A) is equal to or larger than the threshold drive pedal speed request value (SRV-T) the slope of the reduced current limit function and the slope of the maximum current limit function is zero.

9. The method according to claim 1, comprising the steps of:
   determining a torque adjust value for adjusting the current limit value of the reduced current limit function (MIN) depending on the speed value, and
   adjusting the current limit value of the reduced current limit function (MIN) depending on the determined torque adjust value.

10. A computer program product comprising program code means for performing the steps of claim 1 when said program is run on a computer and/or a control unit.

11. A non-transitory computer readable storage medium carrying a computer program comprising program code means for performing the steps of claim 1 when said program product is run on a computer and/or a control unit.

12. A control unit for controlling an electric drive unit of a vehicle, wherein the control unit being configured to perform the steps of the method of claim 1.

13. An electric drive unit comprising a control unit according to claim 12.

14. A vehicle comprising an electric drive unit according to claim 13 and/or a control unit and/or a drive pedal, wherein the electric drive unit and/or the control unit and/or the drive pedal are signaling coupled.

15. The control unit of claim 12 wherein the vehicle is a construction machine.

16. The control unit of claim 15 wherein the construction machine is a wheel loader.

17. The method of claim 1 wherein the vehicle is a construction machine.

18. The method of claim 17 wherein the construction machine is a wheel loader.

\* \* \* \* \*